United States Patent
Oltman (10) Patent No.: US 12,515,568 B2
(45) Date of Patent: Jan. 6, 2026

(54) CHILD RESTRAINT

(71) Applicant: Dorel Juvenile Group, Inc., Foxboro, MA (US)

(72) Inventor: Stephen B. Oltman, Hope, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 178 days.

(21) Appl. No.: 18/372,315

(22) Filed: Sep. 25, 2023

(65) Prior Publication Data

US 2024/0101003 A1    Mar. 28, 2024

Related U.S. Application Data

(60) Provisional application No. 63/409,944, filed on Sep. 26, 2022.

(51) Int. Cl.
B60N 2/28    (2006.01)

(52) U.S. Cl.
CPC ......... B60N 2/2884 (2013.01); B60N 2/2851 (2013.01); B60N 2/2872 (2013.01)

(58) Field of Classification Search
CPC ... B60N 2/2884; B60N 2/2851; B60N 2/2872
See application file for complete search history.

(56) References Cited

U.S. PATENT DOCUMENTS

| | | | |
|---|---|---|---|
| 5,468,047 A | 11/1995 | Goor | |
| 7,234,771 B2 | 6/2007 | Nakhla | |
| 7,717,506 B2 | 5/2010 | Amesar | |
| 7,726,734 B2 | 6/2010 | Mahal | |
| 7,744,154 B2 | 6/2010 | Marsden | |
| 7,959,223 B2 | 6/2011 | Marsden | |
| 8,205,940 B2 | 6/2012 | Mahal | |
| 8,690,237 B2 | 4/2014 | Allen | |
| 8,931,836 B2 | 1/2015 | Cheng | |
| 9,211,820 B2 | 12/2015 | Allen | |
| 9,221,366 B2 | 12/2015 | Oltman | |
| 9,908,444 B2 | 3/2018 | Haas | |
| 9,950,649 B2 | 4/2018 | Pleiman | |
| 10,118,510 B2 | 11/2018 | Mcroberts | |
| 10,988,057 B2 | 4/2021 | Maciejczyk | |
| 11,247,588 B2 | 2/2022 | Kaiser | |
| 11,390,194 B2 | 7/2022 | Maciejczyk | |
| 11,760,238 B2 | 9/2023 | Maciejczyk | |
| 2014/0117729 A1* | 5/2014 | Allen | B60N 2/4235 297/216.11 |
| 2020/0223331 A1* | 7/2020 | Mason | B60N 2/2872 |
| 2022/0305974 A1* | 9/2022 | Hsu | B60N 2/888 |
| 2025/0001916 A1 | 1/2025 | Mitchell | |

OTHER PUBLICATIONS

Office Action (Non-Final Rejection) dated May 21, 2025 for U.S. Appl. No. 18/372,320 (pp. 1-13).

* cited by examiner

*Primary Examiner* — Richard G Davis
(74) *Attorney, Agent, or Firm* — Barnes & Thornburg LLP (57) ABSTRACT

A child restraint includes a seat bottom and a seat back coupled to the seat bottom. The seat back includes a backrest configured to extend upwardly from the seat bottom and a headrest coupled to the backrest for supporting a head of a child. The headrest includes a rear section arranged along the backrest, a first side section extending outwardly away from the rear section, and a second side section extending outwardly away from the rear section and away from the first side section.

20 Claims, 6 Drawing Sheets

CHILD RESTRAINT

PRIORITY CLAIM

This application claims priority under 35 U.S.C. § 119(e) to U.S. Provisional Application Ser. No. 63/409,944, filed Sep. 26, 2022, which is expressly incorporated by reference herein.

BACKGROUND

The present disclosure relates to a child restraint, and particularly to a child restraint configured to be secured to a vehicle seat within a vehicle. More particularly, the present disclosure relates to a child restraint that is configured to reduce undesirable forces acting on a child in the child restraint during operation of vehicle.

SUMMARY

According to the present disclosure, a child restraint includes a seat bottom and a seat back coupled to the seat bottom. The seat back includes a backrest configured to extend upwardly from the seat bottom and a headrest coupled to the backrest for supporting a head of a child. The headrest includes a rear headrest wall arranged along a forward-facing surface of the backrest, a first headrest side wall extending outwardly away from the rear headrest wall, and a second headrest side wall extending outwardly away from the rear headrest wall and away from the first headrest side wall.

In illustrative embodiments, the each headrest side wall includes energy-redirection means configured to redirect at least a portion of a cumulative force from the head of the child during an impact event into at least a first force extending into one of the first and second headrest side walls and a second force extending outwardly away from the rear headrest wall of the headrest so that the head of the child does not experience the cumulative force when impacting the one of the first and second headrest side walls. The first and second forces are each less than the cumulative force as a result of the head of child interacting with the energy-redirection means.

In illustrative embodiments, the energy-redirection means includes a head-movement controller coupled to distal ends of head-support wings. The head movement controllers are configured to deform under load from the child's head during the lateral impact event to reduce forces experienced by the child. During a lateral impact event, the head-movement controller causes the head of the child to roll across the one of the head-support wings and to maintain contact with the headrest side wall for a longer period of time and/or distance during the lateral impact event. This decelerates the child's head and disperses forces acting on the child's head over a greater area and longer period of time thereby reducing the potential for a cumulative force that may injure the child.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIGS. 11-14 are a series of views showing a test dummy seated in a child restraint equipped with a headrest similar to the headrest of FIGS. 1-6 and showing the child restraint and the test dummy experiencing a lateral impact test event that simulates the lateral impact event shown in FIG. 3;

DETAILED DESCRIPTION

Figure 1:
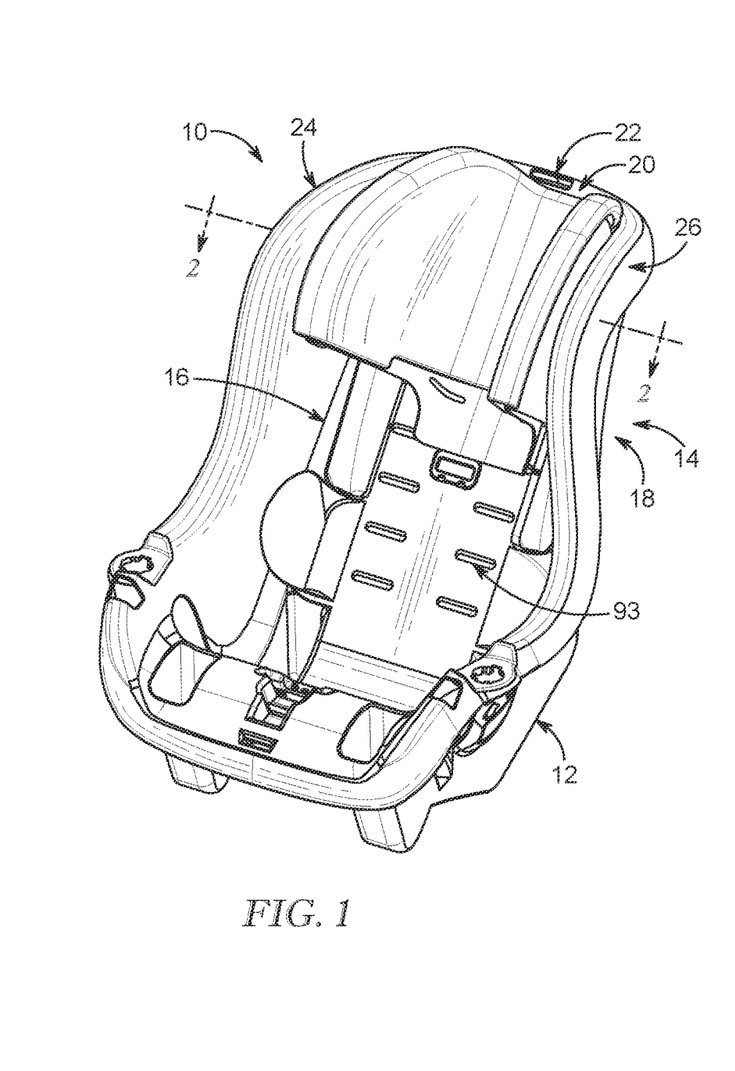
FIG. 1 is a perspective view of a child restraint, in accordance with the present disclosure, including a seat bottom and a seat back coupled to the seat bottom, the seat back including a backrest and a headrest having a head-movement controller configured to reduce a magnitude of one or more forces experienced by a child seated in the child restraint during a lateral impact event.
Figure 2:
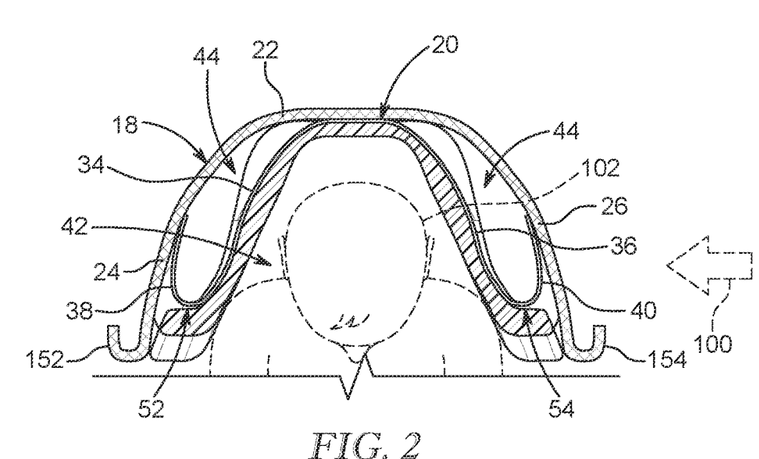
FIG. 2 is a sectional view taken along line 2-2 of FIG. 1 showing the child restraint prior to a lateral impact event and an outline of the child's head (in phantom) positioned between opposing side walls of the headrest.
Figure 3:
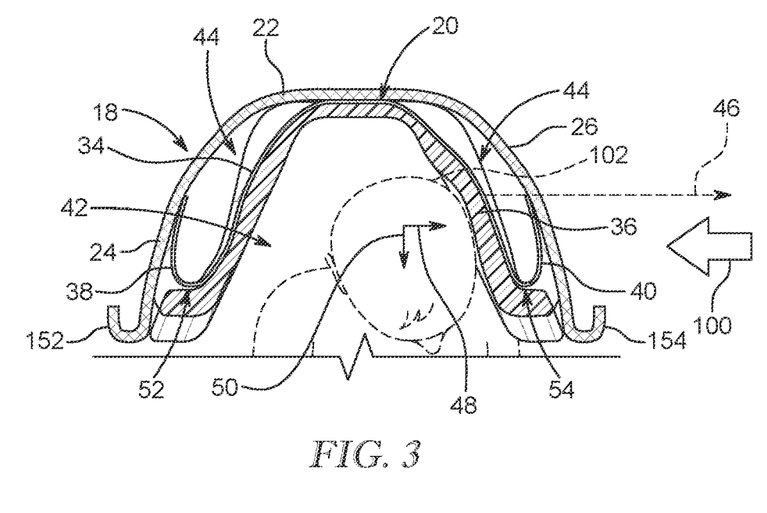
FIG. 3 is a top perspective view of the headrest shown in FIGS. 1 and 2 during a lateral impact event showing the child's head has moved to one of the headrest side walls and the head-movement controller has deformed relative to the backrest so that a potential, cumulative force is transformed into, at least, a first force extending into the headrest side wall o and a second force extending outwardly away from the headrest, and suggesting that each of the first and second forces have a magnitude less than the potential, cumulative force.
Figure 7:
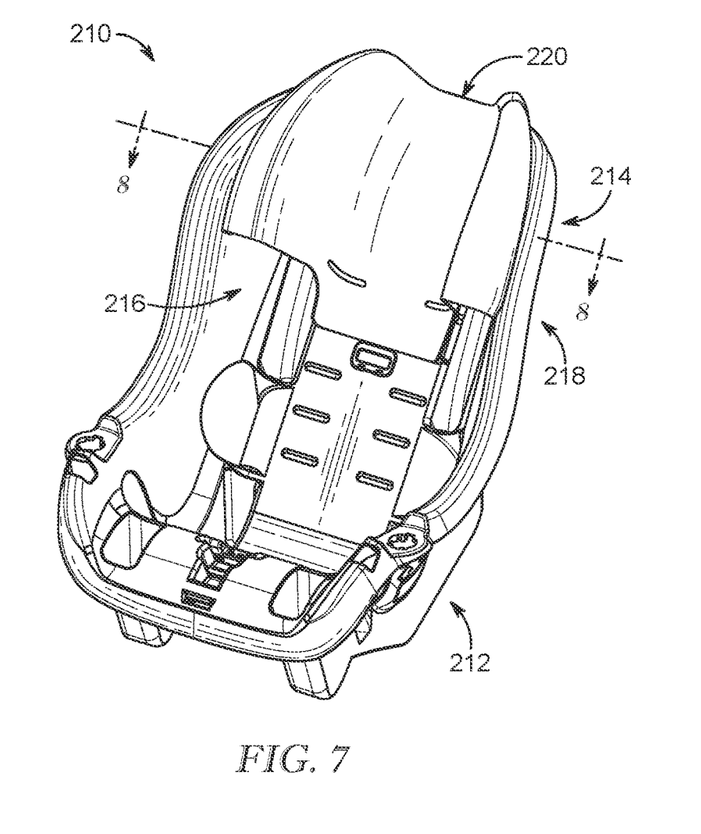
FIG. 7 is a perspective view of a second embodiment of a child restraint in accordance with the present disclosure showing the child restraint includes a head-movement controller.
Figure 8:
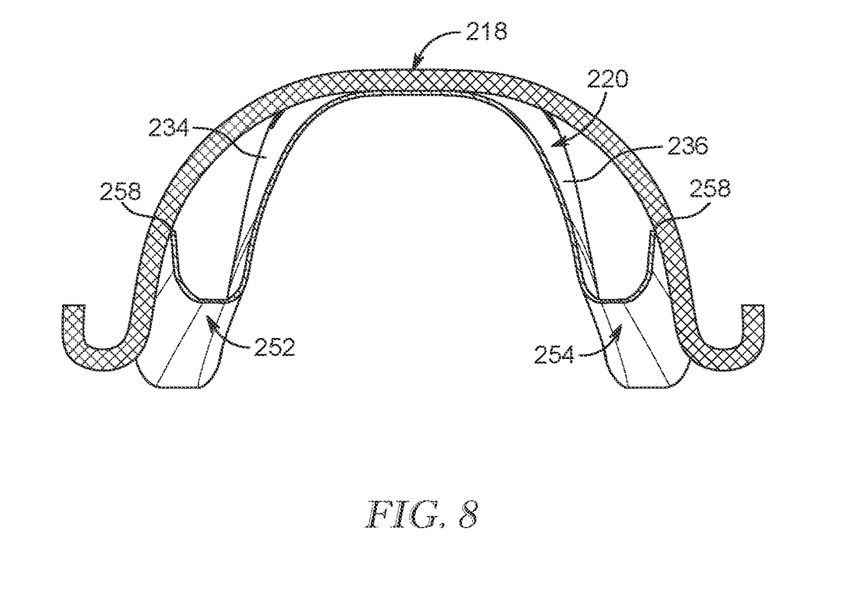
FIG. 8 is a sectional view taken along line 8-8 of FIG. 7.
Figure 9:
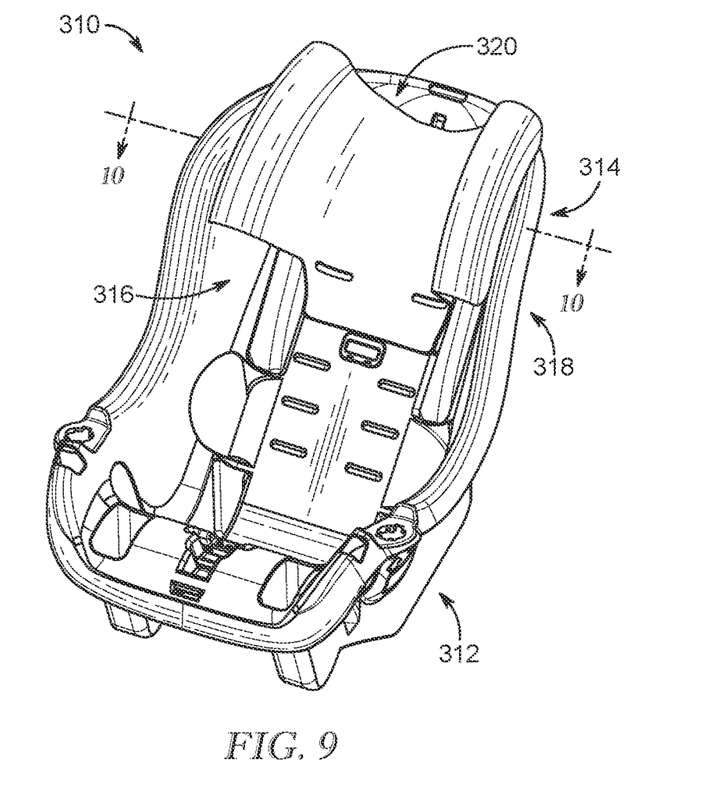
FIG. 9 is a perspective view of a third embodiment of a child restraint in accordance with the present disclosure showing the child restraint includes a head-movement controller.
Figure 10:
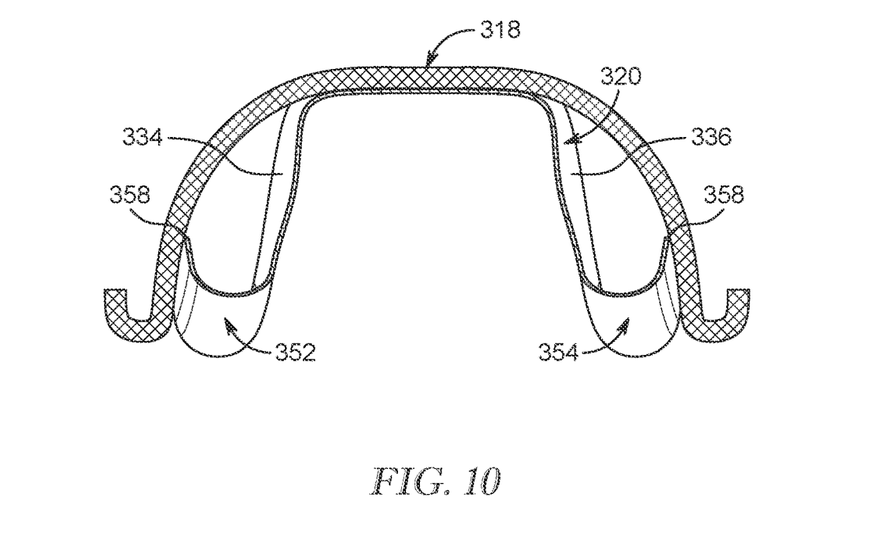
FIG. 10 is a sectional view taken along line 10-10 of FIG. 9.
Figure 11:
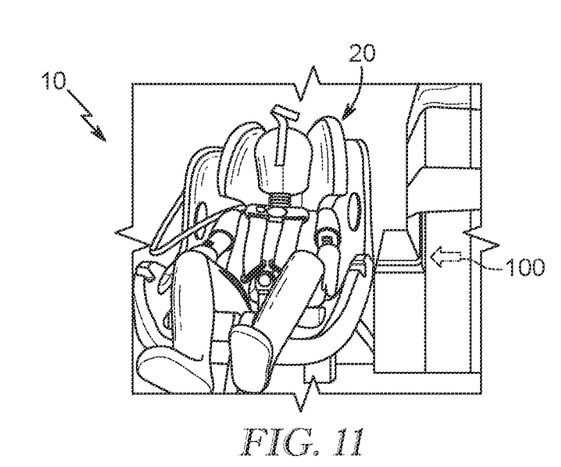
FIG. 11 is a front view of a child restraint with the headrest of FIGS. 1-6 showing the child restraint and the test dummy prior to a lateral impact test event.
Figure 12:
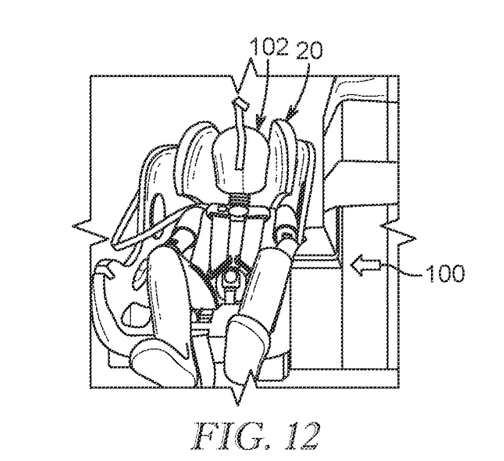
FIG. 12 is a front view of the child restraint with a headrest similar to the headrest of FIGS. 1-6 showing the child restraint and the test dummy impacting a wall to initiate the lateral impact test event and showing a head of the test dummy impacting a side wall of the headrest.
Figure 13:
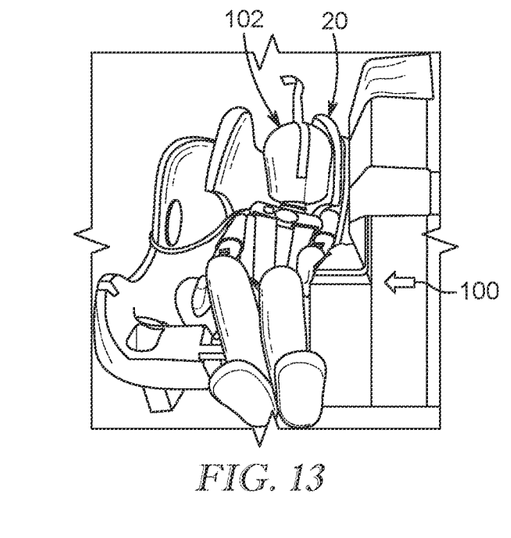
FIG. 13 is a front view of the child restraint with a headrest similar to the headrest of FIGS. 1-6 showing the head of the test dummy deforming one of the deformable rims and rolling along the side wall of the headrest as the lateral impact test event continues.
Figure 14:
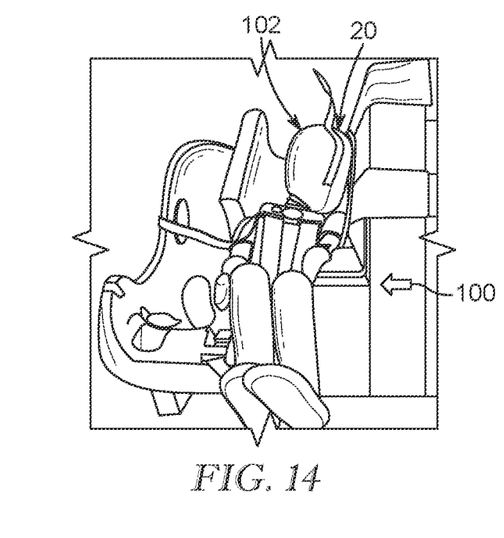
FIG. 14 is front view of the child restraint with a headrest similar to the headrest of FIGS. 1-6 showing the head of the test dummy rolling further along a side wall of the headrest and the deformable rim deforming further to increase an amount of time and distance the head is in contact with the side wall of the headrest during the lateral impact event so that the forces experienced by the head are distributed more efficiently across the side wall.

A first embodiment of a child restraint 10 in accordance with the present disclosure is shown in FIGS. 1-3. A second embodiment of a child restraint 210 in accordance with the present disclosure is shown in FIGS. 7 and 8. A third embodiment of a child restraint 310 in accordance with the present disclosure is shown in FIGS. 9 and 10. The child restraints 10, 210, 310 includes a headrest 20, 220, 320 having a head-movement controller 40, 240, 340 as shown in FIGS. 1-10. The head-movement controller 40, 240, 340 is configured to reduce a magnitude of forces experienced by a child seated on the child restraint 10, 210, 310 by controlling movement of the child's head as the child's head contacts the child restraint 10, 210, 310 during a lateral impact event 100.

The child restraint 10 includes a seat bottom 12 and a seat back 14 coupled to the seat bottom 12. The seat bottom 12 and the seat back 14 define a child-receiving space 16 to hold a child for transportation in a vehicle, for example. The seat back 14 includes a backrest 18 coupled to the seat bottom 12 and arranged to extend upwardly from the seat bottom 12 and the headrest 20 coupled to the backrest for supporting a head of the child.

The backrest 18 includes a rear backrest wall 22, a first backrest side wall 24, and a second backrest side wall 26 as shown in FIGS. 1-3. The headrest 20 may be secured to the rear backrest wall 22. The first and second backrest side walls 24, 26 extend forward away from the rear backrest wall 22 to define the child-receiving space 16 between the first and second backrest side walls 24, 26 and in front of the rear backrest wall 22.

The headrest 20 is coupled to the backrest 18 and is arranged to lie within the child-receiving space 16 for supporting a head of a child 102 seated in the child-receiving space 16 as suggested in FIGS. 2 and 3. The headrest 20 includes a rear headrest wall 28 arranged to extend along the rear backrest wall 22 of the backrest 18, a first headrest side wall 30 arranged to extend outwardly away from the rear headrest wall 28, and a second headrest side wall 32 arranged to extend outwardly away from the rear headrest wall. The first headrest side wall 30 extends along the first backrest side wall 24 while the second headrest side wall 32 extends along the second backrest side wall 26 opposite the first headrest side wall 30.

Figure 5:
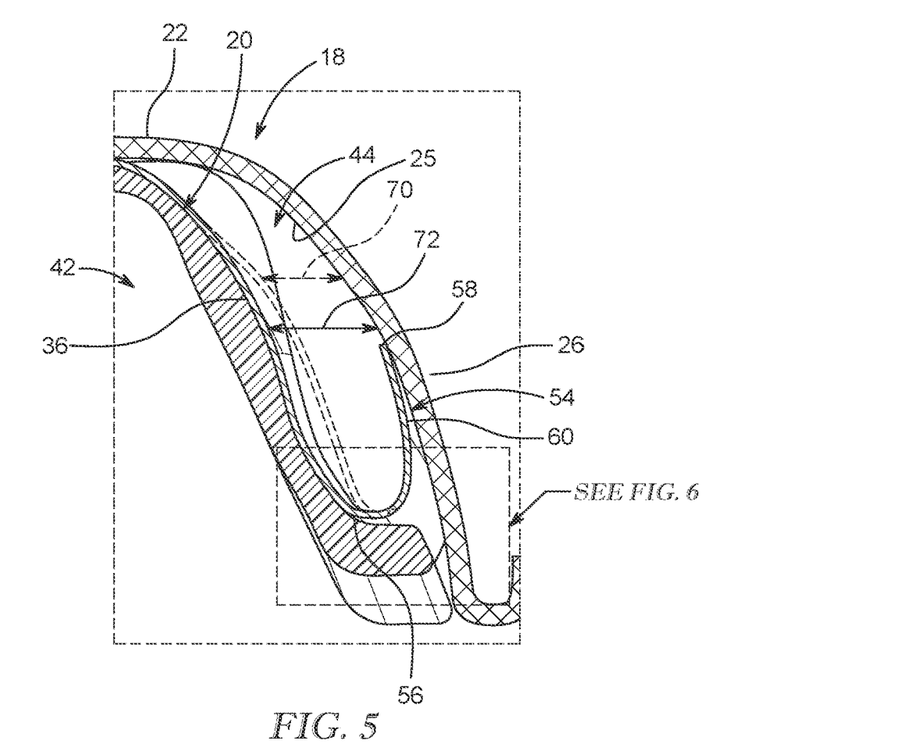
FIG. 5 is an enlarged view of a portion of the child restraint shown in FIG. 2 showing that the head-movement controller includes a deformable rim coupled to a distal end of a head-support wing included in each headrest side wall and showing that the deformable rim includes a proximal end coupled to the head-support wing, a terminal end spaced apart from the proximal end, and a medial strip interconnecting the proximal and terminal ends, the terminal end being spaced apart from a rear surface of the head-support wing to provide an energy-absorption cavity therebetween which decreases in size in response to the child's head impacting the head-support wing during the lateral impact event.

Both the first and second headrest side walls 30, 32 include a head-support wing 34, 36 configured to engage the head of the child and a head-movement controller 38, 40 coupled to a distal end of each head-support wing 34, 36 as shown in FIGS. 2, 3, and 5. The head-support wings 34, 36 define a head-confinement space 42 within the child-receiving space 16 and are configured to block movement of the child's head 102 out of the head-confinement space 42 during normal use of the child restraint 10 (i.e. prior to an impact event). The head-movement controllers 38, 40 provide spacing between each respective head-support wing 34, 36 and each respective backrest side wall 24, 26 and are configured to control movement of the head 102 toward the backrest side wall 24, 26 during the lateral impact event 100.

The head-movement controllers 38, 40 are configured to provide means for establishing the head-confinement space 42 between each of the head-support wings 34, 36 and an energy-absorption space 44 between each head-support wing 34, 36 and each corresponding backrest side wall 24, 26 so that movement of the head-support wings into the energy-absorption space is blocked prior to a lateral impact event as suggested in FIG. 2. During the lateral impact event 100, the head-movement controllers 28, 40 also provide means for redirecting at least a portion of a potential, cumulative force 46 from the head of the child 102 to divide or transform into at least a first force 48 extending into the one of the headrest side walls 30, 32 and a second force 50 extending outwardly away from the rear headrest wall 28. In response to the head 102 of the child impacting one of the head-support wings 34, 36, a width of a corresponding one of the energy-absorption spaces 44 is reduced so that the head of the child does not experience the potential, cumulative force 46 during the lateral impact event and a Head Injury Criterion (HIC) score is minimized. The cumulative force 46 extends in the same direction as first force 48 and has a higher magnitude than first force 48 and second force 50. The first force 48 and the second force 50 may satisfy safety standards while cumulative force 46 would not have satisfied the same safety standards.

The head-movement controllers 38, 40 includes a deformable rim 52, 54 coupled to the distal end of each head-support wing 34, 36 as shown in FIGS. 2 and 3. Each deformable rim 52, 54 is arranged to extend toward each corresponding backrest side wall 24, 26 to provide the energy-absorption space 44 between a rear surface 35 of each head-support wing 34, 36 and a front surface 25 of each corresponding backrest side wall 24, 26. Each deformable rim 52, 54 is configured to deform under load from the head 102 of the child impacting the corresponding head-support wing 34, 36 during lateral impact event 100. The deformable rims 52, 54 provide energy-redirection and/or energy-absorption means for the head of the child.

Each deformable rim 52, 54 includes a proximal end 56 coupled to the distal end of a corresponding head-support wing 34, 36, a terminal end 58 spaced apart from the proximal end 56, and a medial strip 60 extending between and interconnecting the proximal end 56 and the terminal end 58 as shown in FIG. 5. Each proximal end 56 is formed integrally with a respective head-support wing 34, 36. Each terminal end 58 is spaced apart from each respective head-support wing 34, 36. Each deformable rim 52, 54 is curved to extend generally toward rear backrest wall 22 from proximal end 56 to terminal end 58.

Each deformable rim 52, 54 is spaced apart from the rear headrest wall and has a generally convex-shaped forward surface 62 that faces away from the rear headrest wall 22 and a generally concave-shaped rear surface 64 that faces in an opposite direction to the convex-shaped forward surface 62. The concave-shaped rear surface 64 at least partially defines the energy-absorption space 44.

Each head-movement controller 38, 40 further includes a portion of each corresponding backrest side wall 24, 26. The terminal end 58 of a corresponding deformable rim 52, 54 is configured to impact the portion a corresponding backrest side wall 24, 26 during the lateral impact event 100. During the lateral impact event 100, one of the deformable rims 52, 54 is configured to change from a normal, un-deformed state, as shown in FIG. 2, to a deformed state, as shown in FIG. 3. In the un-deformed state, a corresponding head-support wing 34, 36 coupled to the one of the deformable rims 52, 54 is spaced apart from a respective backrest side wall 24, 26 by a first distance 70. In the deformed state, the corresponding head-support wing 34, 36 is spaced apart from the respective backrest side wall 24, 26 by a second distance 72 less than the first distance 70. The un-deformed state occurs when there is no load acting on the head-support wings 34, 36 while the deformed state occurs after a load is applied to one of the head-support wings 34, 36 by the head 102 of the child during the impact event 100. In the deformed state, the head-confinement space 42 may be larger and one of the energy-absorption spaces 44 is smaller than they were in the un-deformed state.

In the illustrative embodiment, the terminal end 58 of each deformable rim 52, 54 is spaced apart from each corresponding backrest side wall 24, 26 before the lateral impact event 100. Each terminal end 58 may be spaced apart from each corresponding backrest side wall 24, 26 at each and every point along the backrest 18 before the lateral impact event 100. The headrest 20 may be movable relative to the backrest 18 between a lowermost position and an uppermost position spaced further from the seat bottom 12 than the lowermost position. The spacing between each terminal end 58 and each corresponding backrest side wall 24, 26 may be greatest when the headrest 20 is at the lowermost position relative to the backrest 18. The headrest 20 may be slidable along the backrest 18 (i.e. using one or more rails), or may be removable from the backrest 18 and reattached to the backrest 18 using one or more clips 91 which extend into corresponding slots 93 formed into the backrest 18. In some embodiments, the terminal end 58 and/or a portion of the medial strip 60 of each deformable rim 52, 54 may be in contact with each corresponding backrest side wall 24, 26 before and after the lateral impact event 100.

In some embodiments, each corresponding head-support wing 34, 36 is arranged to lie generally at a first angle relative to the rear backrest wall 22 when the each of the deformable rims 52, 54 is in the un-deformed state as shown in FIGS. 2 and 5. At least one of the head-support wings 34, 36 is arranged to lie generally at a second angle relative to the rear backrest wall 22 when the at least one of the deformable rims 52, 54 is in the deformed state as shown in FIGS. 3 and 5. The second angle is less than the first angle. Changing from the first angle to the second angle allows the head 102 of the child to roll across the head-support wing 34, 36 to decelerate the head 102 and reduce forces acting thereon during the lateral impact event 100.

In some embodiments, a radius of curvature of one of the deformable rims 52, 54 may also change in response to the deformable rim 52, 54 contacting a respective backrest side wall 24, 26 during the lateral impact event. For example, in the un-deformed state, at least a portion of each deformable rim 52, 54 may have a first radius of curvature. In the deformed state, at least a portion one of the deformable rims 52, 54 may have a second radius of curvature smaller than the first radius of curvature.

The headrest 20 is formed without any reinforcement ribs between the concavely-shaped rear surface 64 of each deformable rim 52, 54 and the rear surface 35 of each head-support wing 32, 34 as shown in FIG. 5. Thus, the concavely-shaped rear surface 64 is substantially smooth and has no protrusions or other structures that extend toward and/or interconnect the rear surface 35 of the head-support wings 32, 34. Other headrests include reinforcement ribs or other structures to rigidify the headrest and thereby block movement and deformation. The headrest 20 in the illustrative embodiment does not include such features so that the deformable rims 52, 54 deform under load and provide the energy-redirection and/or energy-absorption means.

Figure 6:
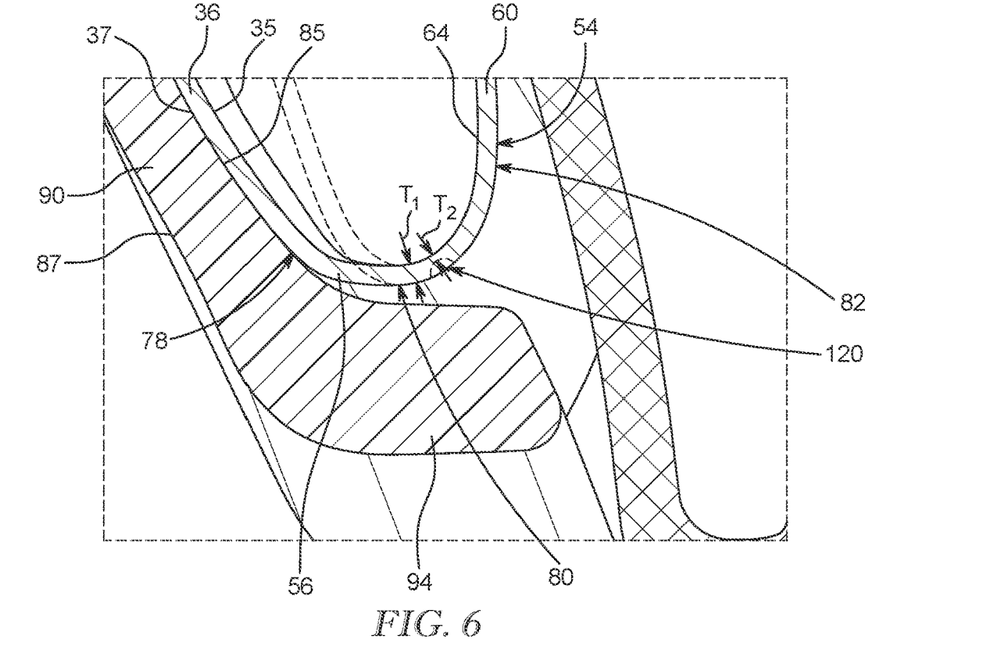
FIG. 6 is an enlarged view of a portion of the child restraint shown in FIG. 5 showing that each headrest side wall may further include a living hinge coupled to the deformable rim to provide an optional area of decreased thickness in the deformable rim so that the deformable rim can bend under load from the child's head during the lateral impact event.

Each deformable rim 52, 54 may include a rim base 78 coupled to the distal end of a corresponding head-support wing 32, 24, a laterally-extending panel 80 coupled to the rim base 78, and a rearwardly-extending panel 82 coupled to the laterally extending panel 80 as shown in FIG. 6. The laterally-extending panel 80 extends outwardly toward each corresponding backrest side wall 24, 26. The rearwardly-extending panel 82 extends rearwardly toward the rear backrest wall 22 alongside of each corresponding backrest side wall 24, 26. The rim base 78, the laterally-extending panel 80, and the rearwardly-extending panel 82 cooperate to provide the concave surface 64. Each of the rim base 78, the laterally-extending panel 80, and the rearwardly-extending panel 82 has a generally curved shape so as to be concave relative to the child-receiving space 16 when the headrest 20 is viewed from a forward side of the child restraint 10. Each of the rim base 78, the laterally-extending panel 80, and the rearwardly-extending panel 82 also has a curved shape so as to be concave relative to the rear backrest wall 22 when the headrest 20 is viewed from a side of the child restraint 10.

Each deformable rim 52, 54 may further include a living hinge 120 as shown in FIG. 6. Each living hinge 120 is provided by an area of each deformable rim 52, 54 having a decreased thickness $T_2$ compared to a thickness $T_1$ of the rest of the headrest side walls 30, 32. The decreased thickness of the living hinge 120 provides a predetermined bend line where each deformable rim 52, 54 will deform under load from the child's head 102 during a lateral impact event.

Figure 4:
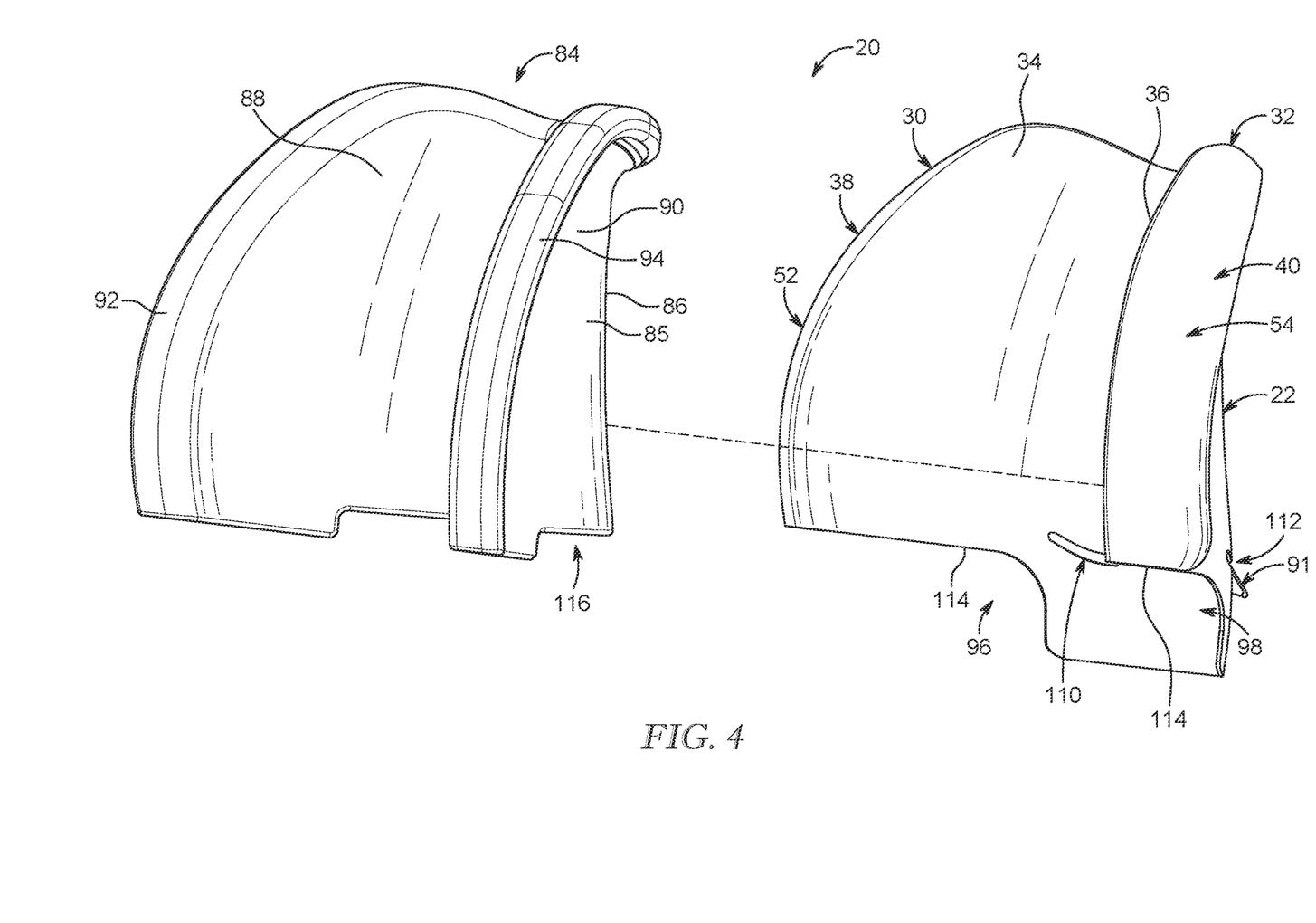
FIG. 4 is an exploded assembly view of the headrest of FIGS. 1-3 showing that the headrest includes a headrest shell having the head-movement controller and an outer comfort layer arranged to overlie the headrest shell and provide cushioning for the child's head during normal use of the child restraint prior to the lateral impact event.

The headrest 20 may further include a top cover 84 that overlies forward-facing surfaces of the rear headrest wall 28 and both headrest side walls 30, 32. The top cover 84 includes rear cover panel 86, a pair of cover side panels 88, 90, and a pair of front tip flanges 92, 94 as shown in FIGS. 4-6. The rear cover panel 86 is arranged to overlie the rear headrest wall 28. Each cover side panel 88, 90 is arranged to overlie a respective headrest side wall 30, 32. Each front tip flange 92, 94 is arranged to overlie at least a portion of a respective deformable rim 52, 54.

A rear surface 85 of the top cover 84 has a shape that matches the front surfaces of the rear headrest wall 28 and both headrest side walls 30, 32. The rear headrest wall 28 and the headrest side walls 30, 32 are formed from a plastic material while the top cover 84 is formed from a foam material (i.e. expanded polyethylene (EPE), expanded polypropylene (EPP), porous expanded polypropylene (P-EPP), cross-linked expanded polyethylene (xEPE), etc.) that does not collapse or compress substantially during an impact event to guide the head 102 of the child during the lateral impact event 100. Thus, the top cover 84 substantially maintains its shape during the impact event 10 to control movement of the child's head 102 during the impact event while the deformable rims 52, 54 deform to provide energy-redirection and/or energy-absorption means. In some embodiments, the headrest 20 does not include any side impact air bags which tend to compress with load and may not direct the head of the child to roll along outer surfaces of the headrest 20.

The rear surface 85 of the top cover 84 has a non-planar shape to match the curvature of a forward surface 37 of each head-support wing 34, 36 as shown in FIG. 6. A forward surface 87 of the top cover 84 is generally planar from the rear cover panel to each tip flange 92, 94 along each of the cover side panels 88, 90. In the illustrative embodiment, substantially all of the rear surface 85 matches and is in contact with the rear headrest wall 28 and headrest side walls 30, 32. In some embodiments, only a majority (i.e. greater than 50%) of the rear surface 85 matches and is in contact with the rear headrest wall 28 and headrest side walls 30, 32. In some embodiments, the headrest 20 may further include a layer of cushioning material (i.e. a compressible foam, soft goods, etc.) that overlies the top cover 84.

The first and second headrest side walls 30, 32 are each formed to include a shoulder-receiving space 96, 98 at a lower end thereof. The rear headrest wall 28 and a portion of each headrest side wall 30, 32 are formed to include a belt-receiving slot 110, 112 that extends through the headrest 20. At least a portion of each belt-receiving slot 110, 112 is aligned with a bottom surface 114 of each headrest side wall 30, 32 partially defining each should-receiving space 110, 112. The top cover 84 is formed to include a cutout 116 that is aligned with the belt-receiving slots 110, 112.

The top cover 84 of the headrest 20 may have the following properties and/or characteristics shown in Table 1.

The properties and/or characteristics in Table 1 above were calculated using the test methods shown in Table 2 at the time of filing this patent application.

TABLE 2

| Physical Property | Test Method |
| --- | --- |
| Average Density | ASTM-D3575 |
| Comp Strength @ 25% | ASTM-D3575 |
| Comp Strength @ 50% | ASTM-D3575 |
| Comp Strength @ 75% | ASTM-D3575 |
| Tensile Strength | ASTM-D3575 |
| Tensile Elongation | ASTM-D3575 |
| Tear Strength | ASTM-D3575 |
| Comp Set @ 25% | ASTM-D3575 |
| Comp Set @ 50% | ASTM-D3575 |
| Buoyancy | ASTM-D3575 |
| Thermal Conductivity | ASTM-C177 |
| Thermal Resistance | ASTM-C178 |
| Service Temp | ASTM-D3575 |
| Water Absorption | ASTM-D3575 |
| Comp Creep | ASTM-D3575 |

Each of the materials shown in Table 1 also passed a Flammabilty test according to test method FMVSS-302. Each of the materials shown in Table 1 also passed a Fuel Immersion test according to test method Coast Guard (CGD-770145) Fuel B.

Some comparable child restraints include a backrest and a headrest. The backrest may include opposing side walls and curved flanges at the end of each side wall. However, comparative headrests are generally designed to minimize spacing between the headrest and the backrest, so the comparative headrest is typically formed as a flat component

TABLE 1

| Physical Property | Unit | EPE | | | | | EPP | | | | xEPE | P-EPP |
| --- | --- | --- | --- | --- | --- | --- | --- | --- | --- | --- | --- | --- |
| Average Density | pcf | 1 | 1.3 | 1.5 | 1.9 | 2.8 | 1 | 1.3 | 1.9 | 2.8 | 1.5 | 2.8 |
| Compression Strength @ 25% | psi | 8 | 10 | 11 | 13 | 22 | 11 | 14.5 | 23.5 | 42 | 6 | 23 |
| Compression Strength @ 50% | psi | 16 | 18 | 19 | 22 | 35 | 19 | 23.5 | 33.5 | 54 | 15 | 35 |
| Compression Strength @ 75% | psi | 38 | 44 | 49 | 56 | 75 | 41 | 45 | 64 | 111 | 40 | 79 |
| Tensile Strength | % | 39 | 40 | 45 | 52 | 70 | 35 | 38 | 55.5 | 67 | 22 | 27 |
| Tensile Elongation | lbs/in | 38 | 32 | 30 | 29 | 25 | 18 | 16 | 15 | 14 | 50 | 13 |
| Tear Strength | % | 12 | 14 | 16 | 17 | 21 | 9 | 10 | 13 | 16 | 12 | 19 |
| Comp Set @ 25% | % | 3 | 3 | 4 | 4 | 4 | 8 | 8 | 7 | 7 | 2 | 5 |
| Comp Set @ 50% | % | 12 | 14 | 13 | 12 | 12 | 16 | 14 | 12 | 12 | 6 | 9 |
| Buoyancy | pcf | 61.2 | 60.6 | 59.5 | 59.5 | 59.1 | 61 | 60.5 | 59.5 | 59 | 61 | n/a |
| Thermal Conductivity | (K) BTU-in/ft-hr-f | 0.26 | 0.26 | 0.24 | 0.24 | 0.24 | 0.24 | 0.24 | 0.24 | 0.24 | 0.25 | 0.265 |
| Thermal Resistance | (R) @ 70 F. | 3.9 | 4 | 4.2 | 4.2 | 4.2 | 4.2 | 4.2 | 4.2 | 4.2 | 4 | 3.8 |
| Service Temp | F. | 160 | 160 | 160 | 160 | 160 | 212 | 212 | 212 | 212 | 185 | 212 |
| Water Absorption | % | −1 | −1 | −1 | −1 | −1 | −1 | −1 | −1 | −1 | −1 | −1 |
| Compression Creep | 1000 hr @ 1 psi | 2.5 | 3 | 3 | 3.3 | 3 | n/a | n/a | n/a | n/a | n/a | n/a | with no curved ends (i.e. deformable rims) such that the side wings of the head rest lay as close to the backrest as possible. Comparative headrests are designed under the theory that minimizing time to engagement of the child's head with headrest during an impact event helps minimize forces imparted to the child's head. The child restraint 10 in the illustrative embodiment may include a backrest 18 and a headrest 20 which both include curved deformable rims 52, 54, 152, 154 as shown in FIGS. 1-3. The deformable rims 152, 154 of the backrest 18 may provide additional energy-redirection and/or energy-absorption means for engaging a surface of a vehicle, as suggested in FIGS. 11-14, during an impact event and deforming under load to decelerate the child restraint 10. Headrests 20, 220, and 320 function in surprising and improved ways as compared to these comparative headrests by managing the impact forces.

The child restraint 10 was tested in a side impact simulator to determine head injury criterion of a child during a lateral impact event. Some child restraints having a headrest without head-movement controller 38, 40 received a Head Injury Criterion (HIC) score of about 700. Unexpectedly, including head-movement controller 40 decreased the HIC score. In one example, the HIC score of headrest 20 was less than 600. In one example, the HIC score of headrest 20 was less than 550. In one example, the HIC score of headrest 20 was less than 540. In one example, the HIC score of headrest 20 was less than 530. In one example, the HIC score of headrest 20 was less than 520. In one example, the HIC score of headrest 20 was less than 510. In one example, the HIC score of headrest 20 was less than 500. In one example, the HIC score of headrest 20 was less than 490. In one example, the HIC score of headrest 20 was less than 480. In one example, the HIC score of headrest 20 was less than 470. In one example, the HIC score of headrest 20 was less than 460. In one example, the HIC score of headrest 20 was less than 450. In one example, the HIC score of headrest 20 was less than 440. In one example, the HIC score of headrest 20 was less than 430. In one example, the HIC score of headrest 20 was less than 420. In one example, the HIC score of headrest 20 was less than 410. In one example, the HIC score of headrest 20 was less than 400. In one example, the HIC score of headrest 20 was less than 390. In one example, the HIC score of headrest 20 was less than 380. In one example, the HIC score of headrest 20 was less than 370. In one example, the HIC score of headrest 20 was less than 360. In one example, the HIC score of headrest 20 was less than 350. In one example, the HIC score of headrest 20 was less than 340. In one example, the HIC score of headrest 20 was less than 330. In one example, the HIC score of headrest 20 was less than 320. In one example, the HIC score of headrest 20 was less than 310. In one example, the HIC score of headrest 20 was less than 300. In one example, the HIC score of headrest 20 was less than 275. In one example, the HIC score of headrest 20 was less than 250.

Another embodiment of a child restraint 210 is shown in FIGS. 7 and 8. The child restraint 210 is similar to child restraint 10. Accordingly, the disclosure of child restraint 10 is incorporated by reference herein for child restraint 210 except for the differences between child restraint 10 and child restraint 210 discussed below.

Child restraint 210 includes a seat bottom 212 and a seat back 214 having a backrest 218 and a headrest 220. Unlike child restraint 10, child restraint 210 does not include a foam top cover 84. The headrest 220 also includes deformable rims 252, 254, however each deformable rim 252, 254 extends outwardly away from head-support wings 234, 236 to terminal ends 258.

Another embodiment of a child restraint 310 is shown in FIGS. 9 and 10. The child restraint 310 is similar to child restraint 10. Accordingly, the disclosure of child restraint 10 is incorporated by reference herein for child restraint 310 except for the differences between child restraint 10 and child restraint 310 discussed below.

Child restraint 310 includes a seat bottom 312 and a seat back 314 having a backrest 318 and a headrest 320. Unlike child restraint 10, child restraint 310 does not include a foam top cover 84. The headrest 320 also includes deformable rims 352, 354, however each deformable rim 352, 354 extends outwardly away from head-support wings 334, 336 to terminal ends 358. The deformable rims 352, 354 also have a generally constant radius of curvature.

The invention claimed is:

1. A child restraint comprising
a seat bottom adapted to rest on a vehicle seat,
a backrest coupled to the seat bottom and arranged to extend upwardly away from the seat bottom, the backrest including a rear backrest wall, a first backrest side wall, and a second backrest side wall, the first and second backrest side walls extend forward away from the rear backrest wall to define a child-receiving space between the first and second backrest side walls and in front of the rear backrest wall, and
a headrest coupled to the backrest and arranged to lie within the child-receiving space for supporting a head of a child seated in the child-receiving space, the headrest including a rear headrest wall arranged to extend along the rear backrest wall of the backrest, a first headrest side wall extending outwardly away from the rear headrest wall and arranged to at least partially overlie the first backrest side wall, and a second headrest side wall extending outwardly away from the rear headrest wall and arranged to at least partially overlie the second backrest side wall,
wherein the first and second headrest side walls each include a head-support wing configured to engage the head of the child and head-movement controller coupled to a distal end of each head-support wing and configured to provide means for: (i) establishing a head-confinement space between each of the head-support wings and an energy-absorption space between each head-support wing and each corresponding backrest side wall so that movement of the head-support wings into the energy-absorption space is blocked prior to a lateral impact event, and (ii) redirecting at least a portion of a cumulative force from the head of the child during the lateral impact event into at least a first force extending into one of the first and second headrest side walls and a second force extending outwardly away from the rear headrest wall of the headrest to cause a width of at least one of the energy-absorption spaces to reduce in response to the head of the child impacting one of the head-support wings so that the head of the child does not experience the cumulative force during the lateral impact event and a Head Injury Criterion (HIC) score is minimized.

2. The child restraint of claim 1, wherein the head-movement controller includes a deformable rim coupled to the distal end of each head-support wing, each deformable rim being arranged to extend toward each corresponding backrest side wall to provide the energy-absorption space between each head-support wing and each backrest side wall.

3. The child restraint of claim 2, wherein each deformable rim includes a proximal end coupled to the distal end of a corresponding head-support wing, a terminal end spaced apart from the proximal end, and a medial strip extending between and interconnecting the proximal end and the terminal end.

4. The child restraint of claim 3, wherein the head-movement controller further includes a portion of a corresponding backrest side wall, and the terminal end of a corresponding deformable rim is configured to impact the portion during the lateral impact event.

5. The child restraint of claim 2, wherein each deformable rim is spaced apart from the rear headrest wall and includes a generally convex-shaped forward surface that faces away from the rear headrest wall and a generally concave-shaped rear surface that faces in an opposite direction to the convex-shaped forward surface.

6. The child restraint of claim 2, wherein during the lateral impact event, one of the deformable rims is configured to change from an undeformed state, in which a corresponding head-support wing coupled to the one of the deformable rims is spaced apart from a respective backrest side wall by a first distance, to a deformed state, in which the corresponding head-support wing is spaced apart from the respective backrest side wall by a second distance less than the first distance, and
wherein the corresponding head-support wing is arranged to lie at a first angle relative to the rear backrest wall when the one of the deformable rims is in the undeformed state and at a second angle relative to the rear backrest wall when the one of the deformable rims is in the deformed state, the second angle is less than the first angle.

7. A child restraint comprising
a seat bottom adapted to rest on a vehicle seat,
a backrest coupled to the seat bottom and arranged to extend upwardly away from the seat bottom, the backrest including a rear backrest wall, a first backrest side wall, and a second backrest side wall, the first and second backrest side walls extend forward away from the rear backrest wall to define a child-receiving space between the first and second backrest side walls and in front of the rear backrest wall, and
a headrest coupled to the backrest and arranged to lie within the child-receiving space for supporting a head of a child seated in the child-receiving space, the headrest including a rear headrest wall arranged to extend along the rear backrest wall of the backrest, a first headrest side wall extending outwardly away from the rear headrest wall and arranged to at least partially overlie the first backrest side wall, and a second headrest side wall extending outwardly away from the rear headrest wall and arranged to at least partially overlie the second backrest side wall,
wherein the first headrest side wall includes a first head-support wing and a first deformable rim coupled to a distal end of the first head-support wing and arranged to extend toward the first backrest side wall to provide a first cavity between the first head-support wing and the first backrest side wall, and the second headrest side wall includes a second head-support wing and a second deformable rim coupled to a distal end of the second head-support wing and arranged to extend toward the second backrest side wall to provide a second cavity between the second head-support wing and the second backrest side wall,
wherein each deformable rim is spaced apart from the rear headrest wall and includes a generally convex-shaped forward surface that faces away from the rear headrest wall and a generally concave-shaped rear surface that faces in an opposite direction to the convex-shaped forward surface.

8. The child restraint of claim 7, wherein the headrest is formed without any reinforcement ribs between the concavely-shaped rear surface of each deformable rim and a rear surface of each head-support wing.

9. The child restraint of claim 7, wherein the first and second cavities are located directly rearward of each respective concave-shaped rear surface and between a portion of each respective concave-shaped rear surface and a portion of each respective head-support wing.

10. The child restraint of claim 7, wherein each deformable rim includes a proximal end coupled to the distal end of each respective head-support wing and a terminal end arranged to lie in spaced apart relation to a rear surface of each respective head-support wing to at least partially locate the first and second cavities between the terminal end and the rear surface of each respective head-support wing.

11. A child restraint comprising
a seat bottom adapted to rest on a vehicle seat,
a backrest coupled to the seat bottom and arranged to extend upwardly away from the seat bottom, the backrest including a rear backrest wall, a first backrest side wall, and a second backrest side wall, the first and second backrest side walls extend forward away from the rear backrest wall to define a child-receiving space between the first and second backrest side walls and in front of the rear backrest wall, and
a headrest coupled to the backrest and arranged to lie within the child-receiving space for supporting a head of a child seated in the child-receiving space, the headrest including a rear headrest wall arranged to extend along the rear backrest wall of the backrest, a first headrest side wall extending outwardly away from the rear headrest wall and arranged to at least partially overlie the first backrest side wall, and a second headrest side wall extending outwardly away from the rear headrest wall and arranged to at least partially overlie the second backrest side wall,
wherein the first headrest side wall includes a first head-support wing and a first deformable rim coupled to a distal end of the first head-support wing and arranged to extend toward the first backrest side wall to provide a first cavity between the first head-support wing and the first backrest side wall, and the second headrest side wall includes a second head-support wing and a second deformable rim coupled to a distal end of the second head-support wing and arranged to extend toward the second backrest side wall to provide a second cavity between the second head-support wing and the second backrest side wall,
wherein each deformable rim includes a proximal end coupled to the distal end of each respective head-support wing and a terminal end arranged to lie in spaced apart relation to a rear surface of each respective head-support wing to at least partially locate the first and second cavities between the terminal end and the rear surface of each respective head-support wing, and
wherein the terminal end of one of the first and second deformable rims is configured to contact a corresponding backrest side wall in response to a load acting on a corresponding head-support wing during a lateral impact event.

12. The child restraint of claim 11, wherein the terminal end is spaced apart from the corresponding backrest side wall before the lateral impact event.

13. The child restraint of claim 12, wherein the terminal end is spaced apart from the corresponding backrest side wall at each and every point along the backrest before the lateral impact event.

14. The child restraint of claim 13, wherein spacing between the terminal end and the corresponding backrest side wall is greatest when the headrest is at a lowermost position relative to the backrest.

15. The child restraint of claim 11, wherein during the lateral impact event, one of the first and second deformable rims is configured to change from an undeformed state, in which a corresponding head-support wing coupled to the one of the first and second deformable rims is spaced apart from a respective backrest side wall by a first distance, to a deformed state, in which the corresponding head-support wing is spaced apart from the respective backrest side wall by a second distance less than the first distance.

16. The child restraint of claim 15, wherein the corresponding head-support wing is arranged to lie at a first angle relative to the rear backrest wall when the one of the first and second deformable rims is in the undeformed state and a second angle relative to the rear backrest wall when the one of the first and second deformable rims is in the deformed state, the second angle is less than the first angle.

17. A child restraint comprising
a seat bottom adapted to rest on a vehicle seat,
a backrest coupled to the seat bottom and arranged to extend upwardly away from the seat bottom, the backrest including a rear backrest wall, a first backrest side wall, and a second backrest side wall, the first and second backrest side walls extend forward away from the rear backrest wall to define a child-receiving space between the first and second backrest side walls and in front of the rear backrest wall, and
a headrest coupled to the backrest and arranged to lie within the child-receiving space for supporting a head of a child seated in the child-receiving space, the headrest including a rear headrest wall arranged to extend along the rear backrest wall of the backrest, a first headrest side wall extending outwardly away from the rear headrest wall and arranged to at least partially overlie the first backrest side wall, and a second headrest side wall extending outwardly away from the rear headrest wall and arranged to at least partially overlie the second backrest side wall,
wherein the first headrest side wall includes a first head-support wing and a first deformable rim coupled to a distal end of the first head-support wing and arranged to extend toward the first backrest side wall to provide a first cavity between the first head-support wing and the first backrest side wall, and the second headrest side wall includes a second head-support wing and a second deformable rim coupled to a distal end of the second head-support wing and arranged to extend toward the second backrest side wall to provide a second cavity between the second head-support wing and the second backrest side wall, and
wherein the deformable rim of each headrest side wall cooperates with each respective backrest side wall to provide energy-redirection means for redirecting at least a portion of a cumulative force from the head of the child during the lateral impact event into at least a first force extending into one of the first and second headrest side walls and a second force extending outwardly away from the rear headrest wall of the headrest so that the head of the child does not experience the cumulative force when impacting the one of the first and second side walls.

18. The child restraint of claim 17, wherein each deformable rim is spaced apart from the rear headrest wall and includes a generally convex-shaped forward surface that faces away from the rear headrest wall and a generally concave-shaped rear surface that faces in an opposite direction to the convex-shaped forward surface.

19. A child restraint comprising
a seat bottom adapted to rest on a vehicle seat,
a backrest coupled to the seat bottom and arranged to extend upwardly away from the seat bottom, the backrest including a rear backrest wall, a first backrest side wall, and a second backrest side wall, the first and second backrest side walls extend forward away from the rear backrest wall to define a child-receiving space between the first and second backrest side walls and in front of the rear backrest wall, and
a headrest coupled to the backrest and arranged to lie within the child-receiving space for supporting a head of a child seated in the child-receiving space, the headrest including a rear headrest wall arranged to extend along the rear backrest wall of the backrest, a first headrest side wall extending outwardly away from the rear headrest wall and arranged to at least partially overlie the first backrest side wall, and a second headrest side wall extending outwardly away from the rear headrest wall and arranged to at least partially overlie the second backrest side wall,
wherein the first headrest side wall includes a first head-support wing and a first deformable rim coupled to a distal end of the first head-support wing and arranged to extend toward the first backrest side wall to provide a first cavity between the first head-support wing and the first backrest side wall, and the second headrest side wall includes a second head-support wing and a second deformable rim coupled to a distal end of the second head-support wing and arranged to extend toward the second backrest side wall to provide a second cavity between the second head-support wing and the second backrest side wall, and
wherein each deformable rim includes a living hinge, each living hinge having a first thickness and each head-support wing having a second thickness greater than the first thickness.

20. A child restraint comprising
a seat bottom adapted to rest on a vehicle seat,
a backrest coupled to the seat bottom and arranged to extend upwardly away from the seat bottom, the backrest including a rear backrest wall, a first backrest side wall, and a second backrest side wall, the first and second backrest side walls extend forward away from the rear backrest wall to define a child-receiving space between the first and second backrest side walls and in front of the rear backrest wall, and
a headrest coupled to the backrest and arranged to lie within the child-receiving space for supporting a head of a child seated in the child-receiving space, the headrest including a rear headrest wall arranged to extend along the rear backrest wall of the backrest, a first headrest side wall extending outwardly away from the rear headrest wall and arranged to at least partially overlie the first backrest side wall, and a second headrest side wall extending outwardly away from the rear headrest wall and arranged to at least partially overlie the second backrest side wall, wherein the first headrest side wall includes a first head-support wing and a first deformable rim coupled to a distal end of the first head-support wing and arranged to extend toward the first backrest side wall to provide a first cavity between the first head-support wing and the first backrest side wall, and the second headrest side wall includes a second head-support wing and a second deformable rim coupled to a distal end of the second head-support wing and arranged to extend toward the second backrest side wall to provide a second cavity between the second head-support wing and the second backrest side wall, wherein each deformable rim includes a rim base coupled to the distal end of a corresponding head-support wing, a laterally-extending panel coupled to the rim base and that extends outwardly toward a corresponding backrest side wall, and a rearwardly-extending panel coupled to the laterally extending panel and that extends rearwardly toward the rear backrest wall along side of each corresponding backrest side wall, wherein the rim base, the laterally-extending panel, and the rearwardly-extending panel cooperate to provide a concave surface relative to the child-receiving space when the headrest is viewed from a forward side of the child restraint, and wherein the rim base, the laterally-extending panel, and the rearwardly-extending panel cooperate to provide a concave surface relative to the rear backrest wall when the headrest is viewed from a side of the child restraint.

* * * * *